United States Patent
Yuan et al.

(10) Patent No.: US 7,125,921 B2
(45) Date of Patent: *Oct. 24, 2006

(54) POLYVINYL BUTYRAL SHEET HAVING ANTIBLOCKING CHARACTERISTICS

(75) Inventors: Ping Yuan, Amherst, MA (US); John J. D'Errico, Glastonbury, CT (US)

(73) Assignee: Solutia Incorporated, St. Louis, MO (US)

( * ) Notice: Subject to any disclaimer, the term of this patent is extended or adjusted under 35 U.S.C. 154(b) by 91 days.

This patent is subject to a terminal disclaimer.

(21) Appl. No.: 10/981,546

(22) Filed: Nov. 5, 2004

(65) Prior Publication Data

US 2005/0090589 A1    Apr. 28, 2005

Related U.S. Application Data

(63) Continuation of application No. 10/427,412, filed on May 1, 2003, now Pat. No. 6,825,255.

(51) Int. Cl.
   *C08K 5/20*    (2006.01)
   *B28B 3/20*    (2006.01)

(52) U.S. Cl. .................... 524/230; 264/176.1; 524/306

(58) Field of Classification Search ............. 264/176.1; 524/230, 306
   See application file for complete search history.

(56) References Cited

U.S. PATENT DOCUMENTS

| | | | |
|---|---|---|---|
| 2,339,056 A | 1/1944 | Craver |
| 2,423,981 A | 7/1947 | Kaltreider |
| 4,226,818 A | 10/1980 | Brower |
| 4,287,107 A | 9/1981 | Hermann |
| 4,533,509 A | 8/1985 | Gust |
| 4,751,266 A | 6/1988 | Hermann |
| 4,968,745 A | 11/1990 | Misra |
| 4,999,078 A | 3/1991 | Misra |
| 4,999,253 A | 3/1991 | Misra |
| 5,030,688 A | 7/1991 | Misra |
| 5,246,764 A | 9/1993 | LaPote |
| 5,399,401 A | 3/1995 | Powell |
| 5,478,412 A | 12/1995 | Simon |
| 5,547,736 A | 8/1996 | Simon |
| 5,594,069 A | 1/1997 | David |
| 5,595,818 A | 1/1997 | Hopfe |
| 5,618,863 A | 4/1997 | D'Errico |
| 5,728,472 A | 3/1998 | D'Errico |
| 5,773,102 A | 6/1998 | Rehfeld |
| 6,093,471 A | 7/2000 | Hopfe |
| 6,136,486 A | 10/2000 | Nguyen |
| 6,372,352 B1 | 4/2002 | Bletsos |

FOREIGN PATENT DOCUMENTS

| | | |
|---|---|---|
| DE | 100 64 373 A 1 | 6/2002 |
| EP | 0780428 A1 | 6/1997 |
| EP | 1241206 A1 | 9/2002 |
| GB | 1047926 | 11/1966 |
| GB | 1141152 | 1/1969 |
| JP | 2001-139352 | 5/2001 |

OTHER PUBLICATIONS

XP-002295452—Anonymous; "Kemamide P-181" Crompton Technical Data Sheets, Online! May 23, 2003—Retrieved from the Internet: <URL :www.cromtoncorp.com>.

*Primary Examiner*—D. S. Nakarani
(74) *Attorney, Agent, or Firm*—Brenc Law

(57) ABSTRACT

A polymer sheet comprising a fatty acid amide featuring enhanced antiblock characteristics. Also a method of manufacturing a polymer sheet by a method comprising incorporating a fatty acid amide with the polymer. Further, a laminated safety glass comprising two sheets of glass with an interlayer polymer sheet disposed therebetween wherein the polymer sheet has a fatty acid amide incorporated therewith.

14 Claims, No Drawings

POLYVINYL BUTYRAL SHEET HAVING ANTIBLOCKING CHARACTERISTICS

CROSS-REFERENCE TO RELATED APPLICATIONS

This application claims priority to and is a continuation of U.S. application Ser. No. 10/427,412 filed on May 1, 2003, now U.S. Pat. No. 6,825,255 which is hereby incorporated by reference in its entirety.

This invention relates to polymer sheet and, more particularly, to polymer sheet comprising polyvinyl butyral featuring enhanced blocking resistance accomplished by a process involving incorporation of certain fatty acid amides as additives to the polymeric sheet.

BACKGROUND

Plasticized polyvinyl butyral (hereinafter "PVB") is commonly used in the manufacture of polymer sheets for use as interlayers in light transmitting laminates such as safety glass or polymeric laminates. Safety glass typically refers to a transparent laminate comprised of a polyvinyl butyral sheet sandwiched between two panes of glass. Safety glass often is used to provide a transparent barrier in architectural and automotive openings. Its main function is to absorb energy, such as caused by a blow from an object, without allowing penetration through the opening, thus minimizing damage or injury to the objects or persons within an enclosed area. Additives to the sheet formulation generally include adhesion control agents ("ACA's") to modify adhesion of the sheet to the glass so that a suitable level of adhesion can be maintained so as to prevent spalling of the glass and yet provide adequate energy absorption on impact. The interlayer sheet also may be modified to impart additional beneficial effects to safety glass such as to attenuate acoustic noise, reduce UV and/or IR light transmission, and/or enhance the aesthetic appeal of window openings.

Safety glass typically is formed by a process in which two layers of glass and a plastic interlayer, such as PVB, are assembled into a pre-press, tacked into a pre-laminate, and finished into an optically clear laminate. The assembly phase involves laying down a piece of glass, overlaying a PVB sheet, laying down a second piece of glass, and then trimming the excess PVB to the edges of the glass layers.

The plastic interlayer generally is produced by mixing PVB polymer with one or more plasticizers, and optionally with one or more other ingredients, and melt processing the mix into sheeting, which typically is collected and rolled for storage and transportation. In the lamination process for automotive windscreens, sections of PVB sheet typically are cut from the roll and these cut sections are shaped and/or stacked for assembly. A cut section then is taken from the stack and assembled in layered arrangement with a rigid substrate (e.g., glass sheet having a particular optical quality) such that a face of the rigid substrate and a face of the cut section are disposed in intimate contact and form a pre-press laminate assembly. Alternatively, this laminate assembly may be formed by interleaving multiple cut section(s) with multiple rigid sheets.

Plasticized PVB sheet, whether in roll form or in stacked form, inherently tends to stick to itself ("block") at ambient temperatures typically encountered before and during the laminating process. Many attempts to enhance the blocking resistance of PVB have been made, including mechanical roughing of the sheet surfaces (e.g., embossing), applying a powder such as sodium bicarbonate to the facing contacting sheet surfaces, and chemically treating the surfaces of the PVB sheeting with acids. Such surface treatments unfortunately often introduce undesireable handling or glass adhesion issues. In another common practice to avoid such blocking, the PVB sheeting may interleaved with another sheet material, such as polyethylene, or may be stored and transported under refrigeration, e.g., at temperatures from about 5 to about 15° C. However, for variations of standard PVB sheeting, such as PVB sheeting incorporating high plasticizer content to accomplish an enhanced noise reduction (acoustic) function, blocking may occur even under refrigeration conditions.

Additionally, it has been proposed to incorporate various blocking-resistant materials into the PVB. Examples of such materials include montanic acid ester, ethylene glycol or propylene glycol $C_1$ to $C_{25}$ alkylethers, e.g., diethylene glycol dodecyl ether and tripropylene glycol dodecyl ether. Incorporation of such materials into the PVB, however, may adversely affect the optical properties of the resulting laminate or the adhesive properties of the PVB sheet to glass.

Accordingly, further improved methods are needed to enhance the blocking resistance of PVB sheet, without adversely affecting optical clarity of laminates and glass adhesion properties of the resulting PVB sheet.

SUMMARY OF THE INVENTION

It now surprisingly has been discovered, according to the present invention, that a polymer sheet comprising a fatty acid amide features enhanced antiblock characteristics without adverse optical and adhesion effects. Also, it has been discovered that antiblocking characteristics may be imparted to a surface of a polymer sheet by a method of manufacture comprising incorporating a fatty acid amide with the polymer. Further, the present invention includes a laminated safety glass comprising two sheets of glass with an interlayer polymer sheet disposed therebetween wherein the polymer sheet has a fatty acid amide incorporated therewith.

In particular, according to the present invention, methods are disclosed to enhance the blocking resistance of a polymer sheet comprising plasticized PVB. The methods include incorporating a surface modifying agent with the plasticized polyvinyl butyrate, wherein the surface modifying agent is a fatty acid amide preferably having a hydrocarbon chain having about 12 to about 40 carbon atoms.

By virtue of the present invention, it is now possible to provide PVB sheet in a rolled or stacked form, which is less susceptible to blocking than PVB sheet which does not comprise the surface modifier of the present invention. The methods of the present invention may be applied to any polymer having a suitable glass transition temperature; the methods are particularly useful in conjunction with PVB sheet having a glass transition temperature below about 40° C.; the invented methods are especially useful in conjunction with PVB sheet having a low glass transition temperature, e.g., below about 20° C. (referred to in the art as "acoustic" PVB sheet). As a result, the requirement to refrigerate or interleave the PVB sheet during transportation and storage can be reduced or eliminated. In accordance with the present invention, the benefits derived from the enhanced blocking resistance can be achieved without substantially adversely affecting other properties of PVB sheet, e.g., clarity or adhesion to glass.

The present invention also provides processes for manufacturing a polymer sheet comprising plasticized polyvinyl butyral. The processes comprise melt processing plasticized polyvinyl butyral into a sheet and incorporating a surface modifying agent with the polymer sheet. Incorporation of the surface modifying agent may be accomplished by adding the agent directly into a molten batch of the polymer prior to extrusion, or by directly applying the antiblock agent onto plasticized PVB sheet.

DETAILED DESCRIPTION OF THE INVENTION

The present invention is directed to a plasticized polymer in sheet form having an antiblock agent disposed at a surface of the polymer sheet. Although the embodiments described below refer to the polymer as being PVB, it should be understood that the polymer may be any polymer having a suitable glass transition temperature. Typical such polymers include polyvinyl butyral, polyurethane, polyvinyl chloride, poly(ethylene vinyl acetate), combinations of the foregoing, and the like. Polyvinyl butyral, polyvinyl chloride, and polyurethane are preferred polymers; polyvinyl butyral is particularly preferred.

PVB is produced by known aqueous or solvent acetalization processes which involve reacting PVOH with butyraldehyde in the presence of acid catalyst, followed by neutralization of the catalyst, separation, stabilization and drying of the resin. The polymer typically comprises about 13 to about 30 weight percent (wt. %) hydroxyl groups calculated as PVOH, and preferably about 15 to about 22 wt. % hydroxyl groups calculated as PVOH. The polymer further comprises up to about 10 wt. % residual ester groups and preferably up to about 3 wt. % residual ester groups calculated as polyvinyl acetate with the balance being an acetal, preferably butyraldehyde acetal, but optionally including other acetal groups, e.g., a 2-ethyl hexanal-group. Typically, the product PVB has a molecular weight greater than about 70,000 grams per mole (g/mole). As used herein, the term "molecular weight" should be construed as the average molecular weight. Details of suitable processes for making PVB are known to those skilled in the art. PVB is commercially available from Solutia Inc., St. Louis, Mo. as Butvar resin.

Additives may be added to the PVB polymer to enhance its performance in a final product. Such additives include, but are not limited to, dyes, pigments, stabilizers (e.g., ultraviolet stabilizers), antioxidants, combinations of the foregoing additives, and the like.

The PVB sheet typically comprises about 20 to 80, and more commonly 25 to 60, parts plasticizer per one hundred parts of resin ("phr"). The amount of plasticizer affects the $T_g$ of the PVB sheet. In general, higher amounts of plasticizer decrease the $T_g$. Generally, the PVB sheets have a $T_g$ of about 30YC or less. PVB sheets having a $T_g$ lower than about 20YC are often used as acoustic PVB sheets. Plasticizers commonly employed are esters of a polybasic acid or a polyhydric alcohol. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also commonly employed plasticizers are mixed adipates made from $C_4$ to $C_9$ alkyl alcohols and cyclo $C_4$ to $C_{10}$ alcohols, as disclosed in U.S. Pat. No. 5,013,779. $C_6$ to $C_8$ adipate esters, such as dihexyl adipate, are preferred plasticizers.

The PVB polymer and plasticizer additives are thermally processed and configured into sheet form. One exemplary method of forming a PVB sheet comprises extruding molten PVB resin (hereinafter "melt") by forcing the melt through a sheet die (e.g., a die having an opening that is substantially greater in one dimension than in a perpendicular dimension). Another exemplary method of forming a PVB sheet comprises casting molten resin or semi-molten resin from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the reactant materials (e.g., the water content of the resin and/or the plasticizer, the melt temperature, or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In any embodiment, the extruded sheets typically have thicknesses of about 0.3 to about 2.5 millimeters (mm).

Fatty acid amides are well known as an important class of polymer additives. One of the major benefits of using such amides as polymer additives is as a slip agent or lubricant to prevent unwanted adhesion. However, unfortunately, the addition of such amides for the purpose of antiblock additives (reduction of unwanted adhesion between surfaces of the polymer itself) has been found to adversely affect the optical characteristics of the polymer film, such as haze, transparency, and film clarity, as well as adhesion of the polymer film to glass. Accordingly, the use of fatty acid amides for such uses as polymer film interlayers in glass laminates appeared to have been precluded.

Unexpectedly, however, it now has been discovered that a fatty acid amide can be successfully used as an antiblocking agent in polymer sheet while not affecting optical properties of the sheet or the adhesive properties of the sheet to glass. The fatty acid amides of the present invention preferably are amides with the general formula:

wherein R defines an anti-blocking segment comprising a hydrocarbon chain having about 12 to about 40 carbon atoms, and R' defines H or a hydrocarbon chain having 1 to about 40 carbon atoms. These amides include erucamide, behenamide, oleyl palmitamide, stearyl erucamide, erucyl steramide, hydroxystearamide, oleic acid diethanolamide, stearic acid diethanolamide, poly(ethylene glycol) oleic amide, octadecanamide (hereinafter "stearamide"), and mixtures of the foregoing amides. Mono-amides are preferred. Secondary mono-amides particularly are preferred. A particularly preferred secondary mono-amide is N-oleyl palmitamide, an amide with a double bond geometry as shown:

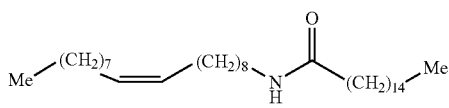

The method of incorporating the amide antiblock agent with the PVB to impart the desired properties to the surface of the PVB sheet is not critical. Preferably, the amide antiblock agent can be added into the melt and extruded. The agent is provided in the melt at a concentration sufficient to provide the desired performances of the antiblocking, clarity and glass adhesion. Preferably the amide is incorporated with the polymer at a concentration of about 0.001 to about 1.0 wt %; more preferably about 0.01 to about 0.6 wt %; most preferably about 0.1 to about 0.3 wt %. The resultant PVB sheet preferably has a blocking force of at least about 50%, more preferably at least about 70%, and most preferably at least about 90% less than the blocking force of a polymer sheet comprising PVB resin without the amide antiblock agent. The clarity of the PVB sheet may be determined by measuring the haze value, which is a quantification of light not transmitted through the sheet and may be determined according to ASTM D1003-61. Preferably, the haze value is less than about 3%, more preferably less than about 2%, and most preferably less than about 1%.

The amide anitblock agent can also be incorporated with the PVB sheet surface by various coating technologies, including, but are not limited to, spray techniques, gravure, electrostatic technology, immersion (dipping) techniques, and the like. In the spray coating process, the agent is disposed as a dispersion of fine particles in a liquid carrier, atomized, and projected at the surface of the PVB sheet. The carrier may be aqueous, or solvent-based (e.g., organic oxygen containing solvents). The concentration of the amide in the carrier should be sufficient to achieve the desired performances. In general, the amide is disposed in the liquid carrier preferably at a concentration of about 0.1 to about 15% by weight; more preferably about 0.5 to about 10%; most preferably about 1 to about 5%. Preferably, one side of the surface is coated with the agent. In the dipping process, the extruded PVB sheet is immersed in a dispersion carrying the amide antiblock agent. Once the amide is deposited on the PVB sheet, the carrier is volatilized off, thereby leaving the antiblock agent on the surface of the PVB sheet.

The glass adhesion of the PVB sheet is substantially unaffected by the presence of the amide antiblock agent. Preferably, the adhesion value (quantification of the tendency of the PVB sheet to adhere to glass) is within about 20%, more preferably within about 10%, most preferably within about 5% of the adhesion value of a PVB sheet without containing antiblock agent. The adhesion to the glass may be measured by any one or a combination of techniques including, but not limited to, peel tests and pummel adhesion tests (tests that measure the bond strength between the PVB sheet and the glass).

Testing Methods

Pummel Adhesion

Two-ply glass laminate samples are prepared with standard autoclave lamination conditions. The laminates are cooled to 0° C. and manually pummeled with a hammer to break the glass. All broken glass unadhered to the PVB sheet is then removed, and the amount of glass left adhered to the PVB sheet is visually compared with a set of standards. The standards correspond to a scale in which varying degrees of glass remain adhered to the PVB sheet. In particular, at a pummel standard of zero, no glass is left adhered to the PVB sheet. At a pummel standard of 10, 100% of the glass remains adhered to the PVB sheet.

Blocking

This test measures the tendency of the PVB sheet to adhere to itself. In this test, two rectangular filmstrips are cut and placed together in completely overlapping pairs. The top sheet of each pair is adhered to a piece of tape of a corresponding size. The film pairs are placed centrally between two steel plates and the assembly is subjected to 69 kPa pressure at the temperatures of 7° C.–25° C. for 24 hours. The strips are then peeled apart in a 90-degree peel test by a peel testing apparatus at a peel speed of 84 inches per minute. The blocking force is quantified in pounds per linear inch (PLI).

% Haze (Clarity)

This test measures the clarity of the laminate made with PVB sheet and is performed in accordance with ASTM D1003-61 (Re-approved 1977)-Procedure A—using Illuminate C, an observer angle of 2 degrees, and an apparatus for measuring the amount of haze is a Hazemeter, Model D25, which is available from Hunterlab.

EXAMPLE 1

Using a high intensity Lab mixer (Brabender), 100 parts polyvinyl butyral resin with a vinyl alcohol content of about 16 wt % and a vinyl acetate residue of 0.5–4 wt % were mixed with 52 parts of triethylene glycol di-(2-ethylhexanoate) as plasticizer, 0.25 phr of the UV absorber Tinuvin 326, and 0.2 phr of various amide waxes as shown in the following Table 1. The mixtures were brabended at a temperature of 180° C. for 7 minutes. The resulting mixing chunks were pressed into 0.76 mm thick sheets under a pressure of 5000 pounds at a temperature of 170° C. for two minutes. All the laminates made with these sheets were conditioned to 0.4 wt % moisture content.

TABLE 1

| Sample | | Peel Blocking | % Haze (25° C.) | | |
|---|---|---|---|---|---|
| No. | Amide Type | (PLI) | (0 time) | (1 week) | (4 weeks) |
| Control | | 4.88 | 0.6 | 0.6 | 0.6 |
| 1 | Stearamide | 4.52 | 0.7 | 0.7 | 0.5 |
| 2 | stearyl erucamide | 1.73 | 0.5 | 2.2 | 4.7 |
| 3 | oleyl palmitamide | 0.14 | 0.7 | 0.8 | 0.7 |
| 4 | erucyl stearamide | 2.19 | 0.7 | 4.1 | 6.1 |
| 5 | Behenamide | 1.54 | 0.5 | 0.6 | 0.4 |

It can be seen that the reported mono-amides at this concentration all have a desirable effect on blocking force; a particularly preferred secondary mono-amide, oleyl palmitamide, featured the most favorable effect as an antiblock agent. Moreover, the laminate clarity was not effected with the addition of the amide antiblock agents; several of the amides, including oleyl palmitamide, also showed no development of haze with time.

EXAMPLE 2

Similar to the description of Example 1 but using pilot plant extrusion process, the PVB sheets were produced with the addition of a bis-amide (N,N'-ethylenebisoleaamide) and a secondary mono-amide (oleyl palmitamide) at different concentrations respectively. The extruded sheet thickness was about 0.76 mm and it issued from the die at about 3.2 meters per minute. The amount of the amides used in the batch were expressed as parts per million (ppm) of total formulation weight.

TABLE 2

| Sample No. | Amide Type | Amount of Amide (ppm) | Blocking Force (PLI) | Pummel Adhesion | % Haze (25° C.) | |
|---|---|---|---|---|---|---|
| | | | | | (1 week) | (4 weeks) |
| Control | | | 4.88 | 4 | 0.5 | 0.5 |
| 1 | oleyl palmitamide | 1000 | 0.037 | 4 | 0.5 | 0.5 |
| 2 | N,N'-ethylenebisoleaamide | 1000 | 2.15 | 4.5 | 0.5 | 0.5 |
| 3 | oleyl palmitamide | 2000 | 0.024 | 4.5 | 0.5 | 0.5 |
| 4 | N,N'-ethylenebisoleaamide | 2000 | 0.212 | 3.5 | 0.6 | 2.1 |

Table 2 shows test results using a particularly preferred amide antiblock additive, oleyl palmitamide, and a bis-amide, N,N'-ethylenebisoleaamide. The results shown in Table 2 demonstrate that when increasing the concentrations of both the amides, the blocking force of both samples were decreased, but the degree of blocking reduction with oleyl palmitamide is much more than N,N'-ethylenebisoleaamide. The laminate clarity was not effected with increased concentration of oleyl palmitamide, while the clarity of the sample with an increased level of N,N'-ethylenebisoleaamide was adversely influenced.

EXAMPLE 3

PVB sheets substantially identical in composition to the PVB control sheet described in Example 2 were cut into sizes of 13 inch×19 inch, and sprayed with an ethanol solution containing 2 wt % various amides to the one side of sheet surface. The ethanol was evaporated and the samples were tested for blocking, haze and pummel adhesion. The coated sample sheets contained about 500 to 2000 parts per million (ppm) amide on the surface. Results of the haze tests, peel force tests, and pummel tests on the PVB sheets are presented below in the Table 3.

TABLE 3

| Sample No. | Amide Type | Carrier | Amount of Amide (ppm) | % Haze | Peel Force (PLI) | Pummel |
|---|---|---|---|---|---|---|
| Control | | | 0 | 0.7 | 3.65 | 6 |
| 1 | stearamide | ethanol | 1000 | 0.7 | 1.97 | 6 |
| 2 | oleyl palmitamide | ethanol | 1000 | 0.5 | 0.084 | 6.5 |
| 3 | N,N'-ethylenebisstearamide | ethanol | 1000 | 1.9 | 0.062 | 6 |

The results in Table 3 show the effective blocking reduction on a polymer surface coated with an amide antiblock agent in contact with non-coated polymer surface. The mono-amides and bis-amides tested here show comparable antiblocking performance, but, the sheet clarity of the polymer sheet with the addition of N,N'-ethylenebisstearamide was adversely influenced.

EXAMPLE 4

Using the same pilot plant extrusion process described in Example 2, 100 parts by weight polyvinyl butyral polymer with a vinyl alcohol content of 10 wt %–21 wt % and a vinyl acetate residue of 0.5–4 wt % were mixed with 30–60 parts by weight triethylene glycol di-(2-ethylhexanoate) as plasticizer. To the mixture, added with 0.25 parts by weight of the UV absorber Tinuvin 326 and 0.25 parts of Oleyl palmitamide. The amide was added either in a beads form or the dispersion in the plasticizer. The comparisons of the properties with and without the addition of the amide for two different formulations were summarized in Table 4.

The blocking peel test for two different formulations was conducted at two different temperatures due to their different mechanical property virtues. It can be seen that the blocking force was dramatically reduced for the formulations with the amide addition, while the other properties were not influenced. The results indicated the possibilities of eliminating or reducing the requirement to refrigerate or interleave the PVB sheet during transportation and storage.

TABLE 4

| | 1 Control | 2 | 3 Control | 4 |
|---|---|---|---|---|
| PVB RESIN FORMULATION | | | | |
| Polyvinyl butyral | 100 | 100 | 100 | 100 |
| Triethylene glycol di-(2-ethylhexanoate) | 52 | 52 | 38 | 38 |
| Tinuvin 326 (UV absorber) | 0.25 | 0.25 | 0.25 | 0.25 |
| Oleyl palmitamide | | 0.25 | | 0.25 |
| PROPERTY | | | | |
| % haze | 0.5 | 0.5 | 0.5 | 0.6 |
| Glass Pummel Adhesion | 3.8 | 4.6 | 5.9 | 6.4 |
| Blocking Peel Force (PLI) at 10° C. | 1.82 | 0.032 | | |
| Blocking Peel Force (PLI) at 25° C. | | | 5.14 | 0.018 |

The above-described embodiments of PVB sheet having fatty acid amide modified surfaces are suitable for use in typical PVB interlayer applications for laminated safety glass. Furthermore, the above-described embodiments, because of the modification of the sheet surfaces, are especially useful for non-interleaving acoustic interlayer product applications.

The PVB sheet as described above also has several advantages over PVB sheet that does not have the amide surface modifying agents incorporated therewith. First, the PVB sheet having the amide modifying agent incorporated therewith has a considerably reduced tendency to block while maintaining sufficient optical quality and appropriate adhesion properties to glass. These properties are important when the produced PVB sheet is incorporated into laminated safety glass. By having a reduced tendency to block, the PVB sheet can then be stored and transported with a reduced need for refrigeration. Second, because the amide surface modifying agents disclosed above are at least partially compatible with the PVB, additional processing steps such as embossing, interleaving, or washing the sheet to remove surface applications such as powder do not need to be performed. Other advantages will be readily apparent to those skilled in the art.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of manufacturing a polymer sheet having antiblocking properties, comprising:
incorporating a fatty acid amide with said polymer sheet, wherein said polymer sheet is a plasticized polyvinyl butyral sheet and said fatty acid amide has the formula

R—CO—NH—R', wherein R defines an anti-blocking, segment comprising a hydrocarbon chain having about 12 to about 40 carbon atoms, and R' defines H or a hydrocarbon chain having 1 to about 40 carbon atoms.

2. The method of claim 1, wherein said fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol) oleic amide, stearamide, and a combination of at least one of the foregoing amides.

3. The method of claim 1, wherein the fatty acid amide is oleyl palmitamide.

4. The method of claim 3, wherein said oleyl palmitamide comprises 0.001 wt % to 1.0 wt % of a melt used to form said polymer sheet.

5. The method of claim 4, wherein said oleyl palmitamide comprises 0.01 wt % to 0.6 wt % of a melt used to form said polymer sheet.

6. The method of claim 5, wherein said oleyl palmitamide comprises 0.1 wt % to 0.3 wt % of a melt used to form said polymer sheet.

7. The method of claim 1, wherein R' is not H.

8. The method of claim 1, wherein R' is H.

9. The method of claim 1 wherein said fatty acid amide is incorporated by introducing said fatty acid amide into an extrusion batch of melted polymer.

10. The method of claim 9, wherein said fatty acid amide is incorporated by introducing said fatty acid amide into an extrusion batch of melted polymer in the form of beads.

11. The method of claim 9, wherein said fatty acid amide is incorporated by introducing said fatty acid amide into an extrusion batch of melted polymer by dispersing said fatty acid amide into a plasticizer.

12. A polymer sheet having antiblocking properties formed by the process comprising:
incorporating a fatty acid amide with said polymer sheet, wherein said polymer sheet is a plasticized polyvinyl butyral sheet and said fatty acid amide has the formula

R—CO—NH—R', wherein R defines an anti-blocking segment comprising a hydrocarbon chain having about 12 to about 40 carbon atoms, and R' defines H or a hydrocarbon chain having 1 to about 40 carbon atoms and wherein said fatty acid amide is incorporated by introducing said fatty acid amide into an extrusion batch of melted polymer.

13. The polymer sheet of claim 12, wherein said fatty acid amide is incorporated by introducing said fatty acid amide into an extrusion batch of melted polymer in the form of beads.

14. The polymer sheet of claim 12, wherein said fatty acid amide is incorporated by introducing said fatty acid amide into an extrusion batch of melted polymer by dispersing said fatty acid amide into a plasticizer.

* * * * *